United States Patent [19]

Bungay et al.

[11] Patent Number: 4,624,135

[45] Date of Patent: Nov. 25, 1986

[54] FUEL INJECTION NOZZLES

[75] Inventors: Michael R. Bungay; John W. Stevens; Richard M. Turner, all of Sudbury; Richard J. Andrews, Guildford, all of England

[73] Assignee: Lucas Industries public limited company, Birmingham, England

[21] Appl. No.: 681,616

[22] Filed: Dec. 14, 1984

[30] Foreign Application Priority Data

Jan. 31, 1984 [GB] United Kingdom ................. 8402469

[51] Int. Cl.[4] ........................ G01M 15/00; F22G 7/14; F02M 39/00; B67D 5/08

[52] U.S. Cl. .................................... 73/119 A; 239/71; 239/533.3; 123/473

[58] Field of Search ..................... 239/71, 533.3, 533.9; 73/119 A; 123/473, 479

[56] References Cited

U.S. PATENT DOCUMENTS

| | | | |
|---|---|---|---|
| 3,942,366 | 3/1976 | Hofmann | 73/119 A |
| 4,206,635 | 6/1980 | Teerman | 73/119 A |
| 4,359,895 | 11/1982 | Wolff et al. | 73/119 A |

FOREIGN PATENT DOCUMENTS

| | | | |
|---|---|---|---|
| 155275 | 9/1983 | Japan | 73/119 A |

*Primary Examiner*—Andres Kashnikow
*Assistant Examiner*—Patrick N. Burkhart

[57] ABSTRACT

A fuel injection nozzle for supplying fuel to an internal combustion engine includes a fuel pressure actuated valve member which moves into a chamber when it is lifted from its seating. The displacement of fuel in the chamber is served by a spring biased plunger which forms part of an electrical switch.

5 Claims, 3 Drawing Figures

FUEL INJECTION NOZZLES

This invention relates to fuel injection nozzles for supplying fuel to internal combustion engines, the nozzles being of the kind comprising a valve member slidable within a bore, a seating defined at one end of the bore, the valve member being shaped for co-operation with the seating, resilient means acting to bias the valve member into contact with the seating, an outlet from said one end of the bore, a step defined on the valve member, passage means extending from a nozzle inlet and through which the pressure of fuel supplied to said inlet can act on said step to lift the valve member from the seating to allow fuel flow through said outlet, a chamber which accommodates said resilient means and into which the end of said valve member remote from the seating extends and a drain extending from said chamber.

Such nozzles are well known in the art being commonly known as "inwardly opening" nozzles. In order to satisfy emission laws now enacted in many countries of the world and in order to economise so far as is possible, on the consumption of fuel it is necessary to be able to control the instant of fuel delivery to the engine and for accurate control it is necessary to know when the valve member lifts from its seating. Various nozzles are known which incorporate means responsive to the movement of the valve member to provide the desired signal. In some cases the performance of the nozzle is affected by the additional components which are required. One nozzle, the performance of which is not affected by the modifications to it, is described in British Patent Specification No. 1586254. In this nozzle the resilient means in the form of a coiled spring which electrically connects the valve member to a terminal on the exterior of the nozzle body and the valve member and seating constitute a simple electrical switch which is opened when the valve member is lifted from its seating. Reliance is placed upon the thin film of fuel in the working clearance between the wall of the bore and the valve member to insulate the valve member when the latter is lifted from the seating. It has been found that this is not entirely satisfactory and attempts have been made to provide an insulating coating on the wall of the bore or the valve member. The provision of such coatings again adds to the cost of manufacture of the nozzle.

The object of the present invention is to provide a fuel injection nozzle of the kind specified in a simple and convenient form.

According to the invention a fuel injection nozzle of the kind specified comprises a sensing device responsive to the displacement of fuel which occurs in said chamber as the valve member is lifted from the seating.

An example of a fuel injection nozzle in accordance with the invention will now be described with reference to the accompanying drawing, in which FIG. 1 shows an embodiment of the fuel injection nozzle of the invention;

Figure 1:
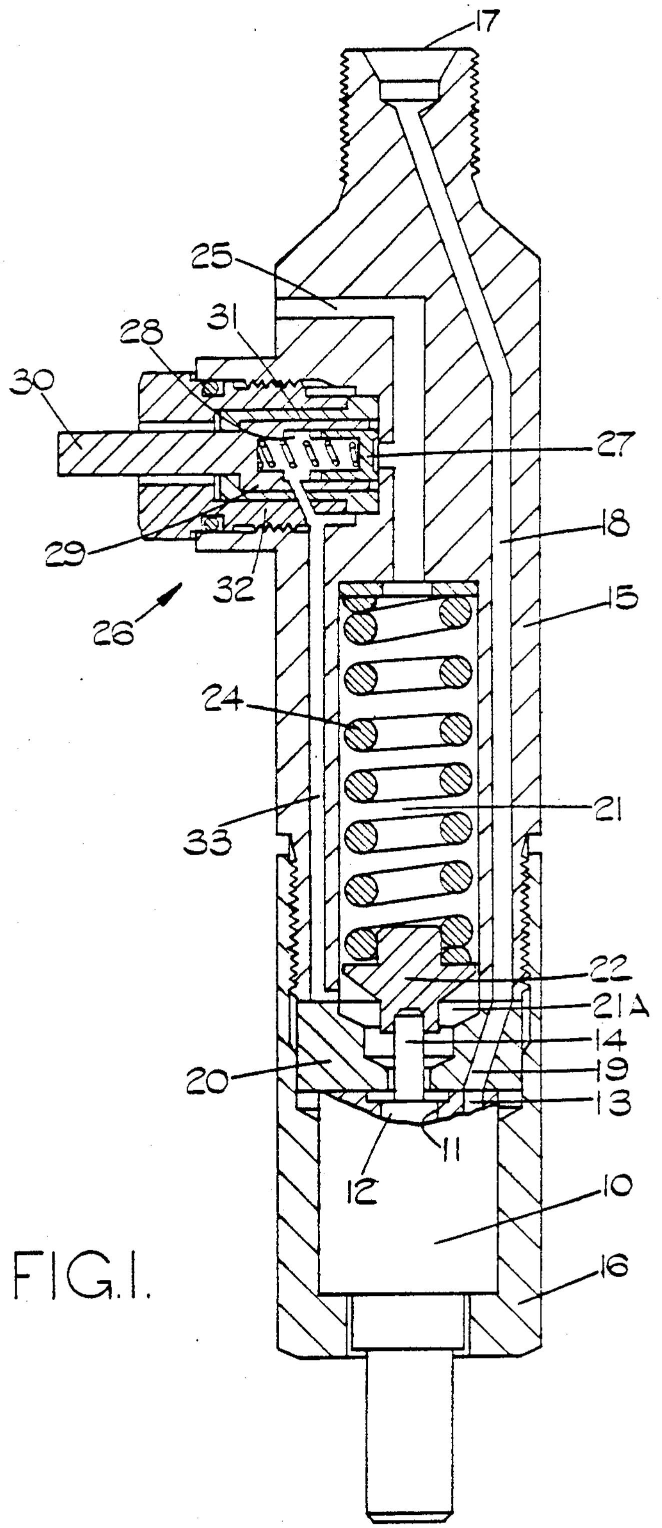

Referring to the drawing the nozzle comprises a nozzle body 10 of stepped cylindrical form in which is defined a bore 11 in which is located a valve member 12. Fuel under pressure can act upon the valve member to lift the valve member from a seating to allow fuel flow through an outlet in known manner, the fuel being supplied by way of a passage 13.

The valve member extends from the end of the bore in an extension 14 of reduced diameter. The nozzle body is secured to a generally cylindrical holder 15 by means of a cap nut 16 through the base wall of which the nozzle body extends. The cap nut and holder are provided with engaging screw threads. The holder 15 defines a fuel inlet 17 which communicates with the passage 13 by way of a passage 18 and a communicating passage 19 which is formed in a stop member 20.

Formed within the holder 15 is a chamber 21 into which the extension 14 of the valve member extends. Mounted upon the extension is a spring abutment 22 which serves as an abutment for a coiled compression spring 24 the opposite end of the spring engaging the end of the chamber. A fuel leak off passage 25 communicates with the chamber 21 and through which fuel leaking between the valve member and the wall of the bore can escape from the chamber. The chamber in use is full of fuel.

In operation, when fuel under pressure is supplied to the inlet 17, the fuel pressure acts upon the valve member and when the pressure is sufficient, the valve member is lifted from the seating to permit fuel flow through the outlet. The extent of movement of the valve member against the action of the spring is limited by its abutment with an inwardly extending portion of the end surface of the stop member 20. When the valve member lifts from the seating there is a displacement of fuel into the chamber 21 and as a result there is also a displacement of fuel through the passage 25.

The spring abutment 22 has a diameter which is larger than that of the valve member 12 and in addition for design considerations has a small working clearance with the wall of the chamber 21 and it therefore tends to act like a piston. The portion 21A of the chamber experiences an increase in volume as the valve member is moved to the open position and the pressure therein falls. When the valve member closes onto its seating the pressure in the portion 21A of the chamber tends to increase.

The variation in pressure within the portion 21A of the chamber is utilized to operate a sensing device generally indicated at 26. The sensing device enables an electrical signal to be produced which is indicative of the lifting of the valve member from its seating. The device 26 comprises a spring loaded metal piston 27 which is slidable within a cylinder 28 defined in a cup shaped member 29. The member 29 is formed from metal and has a terminal member 30 integrally formed therewith. The member 29 is supported in an electrically insulating housing 31 which is of generally cylindrical form and having a flange at its open end with which is engaged a hollow threaded retaining member 32 which holds the housing against the base wall of a recess in the holder 15. The dimensions of the components are such that a clearance exists between the end of the cup shaped member 29 and the base wall of the recess. In the base wall of the recess is a port which communicates with the passage 25. The piston 27 is biased into contact with the base wall by a coiled compression spring which also ensures an electrical connection between the piston and the cup shaped member 29. The portion of the cylinder 28 which accommodates the spring is in communication with the portion 21A of the chamber by way of a passage 33 so that the piston 27 is subjected to the pressure difference which occurs when the valve member is moved, on the opposite sides of the abutment 22.

The arrangement is such that when the valve member is opened, the piston 27 is moved away from the base wall of the recess thereby breaking the electrical connection between the terminal member 30 and the holder 15. The break in the electrical connection provides an indication of lifting of the valve member from the seating. The provision of the device 26 and the fuel connections thereto helps to minimise the risk of cavitation of the fuel in the portion 21A of the chamber 21. It will be understood that the piston 27 can be replaced by for example a diaphragm which may carry an electrical contact so that it can function in the same manner as the piston.

Figure 2:
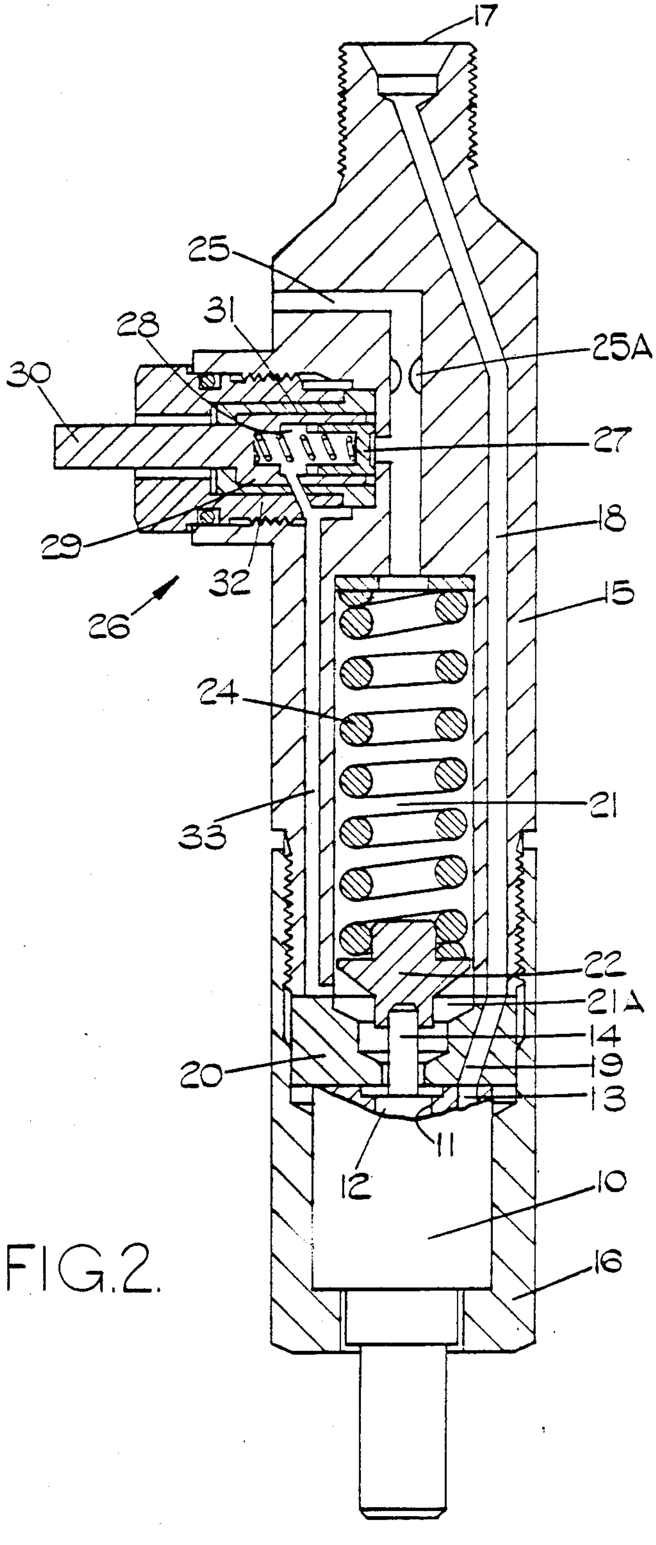
FIG. 2 shows a modifictaion of FIG. 1.

In a modification shown in FIG. 2 a restrictor 25A is incorporated in the passage 25 downstream of its connection with the aforesaid port. The effect of the restrictor is to enhance the increase in the pressure in the main portion of the chamber 21 when the valve member is lifted from the seating. The piston 27 will therefore be subjected to a larger pressure difference than is the case with the example illustrated.

Figure 3:
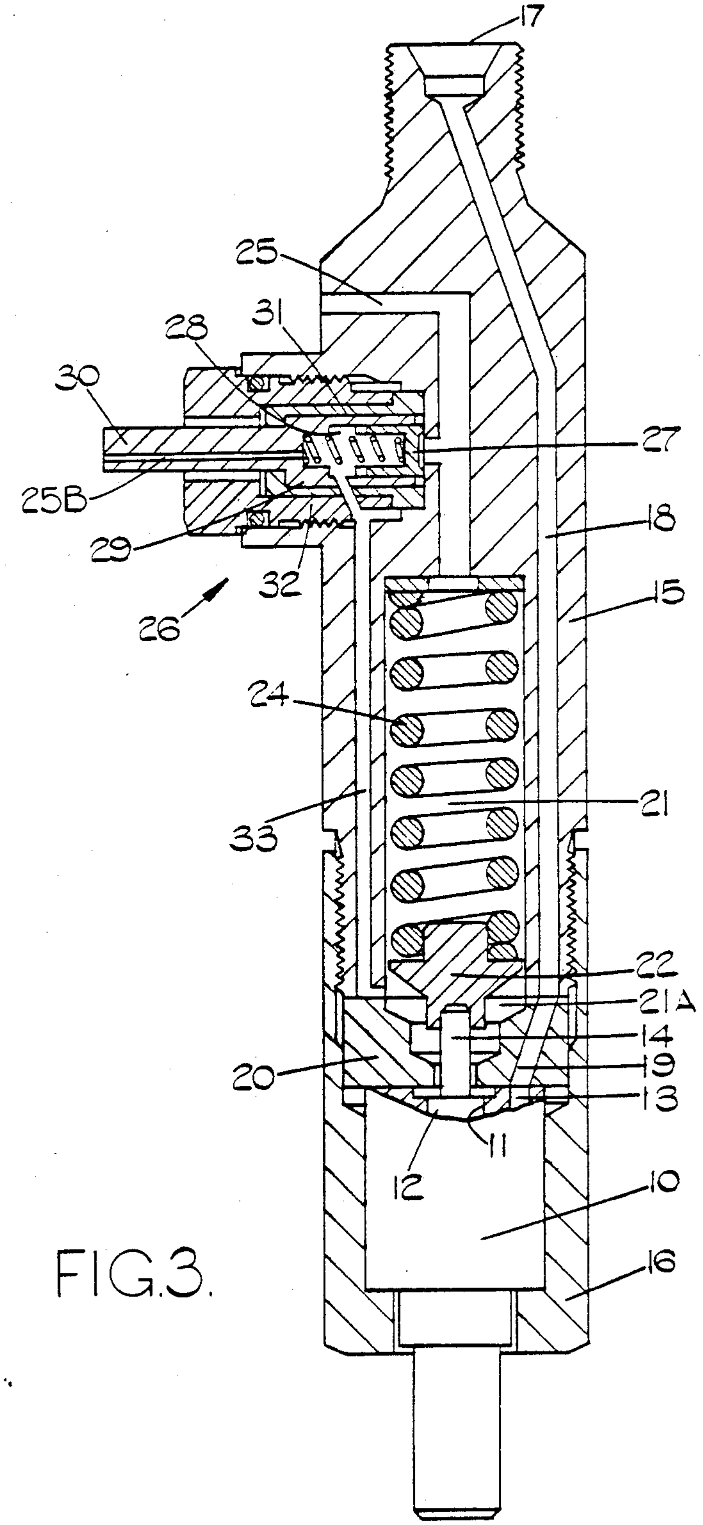
FIG. 3 shows a further modification of FIG. 1.

In a further modification shown in FIG. 3 the passage 25 is omitted although the port in the base wall of the recess is still connected to the chamber 21. A leakage channel 25B is formed in the terminal member 30 or it may extend from the passage 33.

It has been found that the time required for the piston 27 to move through its allowed stroke is proportional to the rate of movement of the valve member 12. Therefore by providing a contact member which is engaged by the piston at the end of its stroke a signal can be obtained indictive of the lift of the valve member.

We claim:

1. A fuel injection nozzle for supplying fuel to an internal combustion engine, comprising a valve member slidable within a bore, a seating defined at one end of the bore, the valve member being shaped at one end for cooperation with said seating, a walled chamber into which the other end of said valve member extends, a spring abutment carried on said other end of the valve member, a coiled compression spring located in said chamber and engaging said spring abutment to bias the valve member into contact with the seating, an outlet from said one end of the bore, a step defined on the valve member, passage means extending from a nozzle inlet and through which the pressure of fuel supplied to said inlet can act on said step to lift the valve member from the seating to allow fuel flow through said outlet, a periphery of said spring abutment having a working clearance with the wall of the chamber, a port communicating with a first portion of the chamber located on one side of the spring abutment which is remote from the valve member, passage means communicating with a second portion of the chamber located on another side of the spring abutment, a cylinder, a plunger slidable in said cylinder, said port being connected to one end of the cylinder and the passage means to the other end thereof, a spring biasing the plunger to said one end of the cylinder, said plunger being subjected to the pressure difference between said portions of the chamber when the valve member is lifted from its seating and being moved against the action of its spring, said plunger forming part of an electric switch means from which a signal can be obtained indicative of lifting of the valve member from its seating, and a drain extending from said chamber.

2. A fuel injection nozzle according to claim 1 in which said chamber and said spring abutment are larger in diameter than said bore and said valve member.

3. A fuel injection nozzle according to claim 1 in which said drain is connected to said first portion of the chamber and includes a restrictor whereby the plunger will be subjected to an increased pressure difference.

4. A fuel injection nozzle according to claim 1 in which said drain extends from said other end of the cylinder.

5. A fuel injection nozzle according to any one of claims 1, 2, 3 or 4 including a metallic part in which said cylinder is defined, means mounting said part in electrically insulating relationship with a metal body which defines said chamber, an electrical terminal connected to said metallic part, the plunger and spring being formed from metal and providing an electrical connection between said part and the body, said electrical connection being broken upon movement of the plunger against the action of its spring due to movement of the valve member away from its seating.

* * * * *